July 27, 1926.

A. J. R. FIEGO

SPRING PIVOT BEARING

Filed June 19, 1924

1,594,054

Inventor:
Alexander J. R. Fiego,
by *Alexander S. [signature]*
His Attorney.

Patented July 27, 1926.

1,594,054

UNITED STATES PATENT OFFICE.

ALEXANDER J. R. FIEGO, OF LYNN, MASSACHUSETTS, ASSIGNOR TO GENERAL ELECTRIC COMPANY, A CORPORATION OF NEW YORK.

SPRING-PIVOT BEARING.

Application filed June 19, 1924. Serial No. 721,132.

The present invention relates to pivot bearings for meter shafts and the like and has for its object the provision of an improved meter bearing of the pivot type which is simple and rugged in structure and capable of withstanding shocks and vibration incident to hard usage without becoming broken or impaired in sensitivity.

The invention is particularly applicable to meters which in use are at times subject to vibration and accidental shock and is for this reason herein shown and described in its application to a planimeter which represents a meter of this class. It should be understood, however, that the invention is not limited thereto but may be embodied in any device requiring a sensitive, rugged bearing for a rotating part.

For a further consideration of what is believed to be novel and the invention, attention is now directed to the accompanying drawing, the description thereof and the appended claims.

Figure 2:
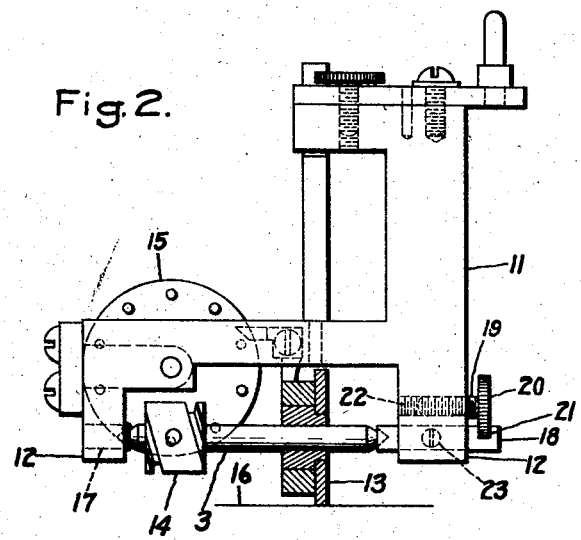
Figure 1:
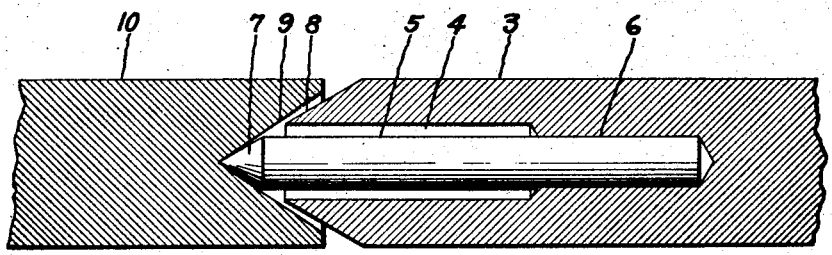

In the drawing, Fig. 1 is a longitudinal sectional view on a greatly enlarged scale of a bearing embodying the invention, and Fig. 2 is an end elevation of a planimeter provided with the bearing of Fig. 1. Fig. 2 is also on an enlarged scale but is very much reduced from that of Fig. 1.

Referring particularly to Fig. 1, 3 is a meter shaft, in the end of which is formed a tubular axial recess or counterbore 4 for a pivot pin 5 of spring material.

In order that the small size of the hereinafter described pivot bearing and application thereof may be more fully appreciated and not in any way as a limitation of the invention, it may here be explained that while the drawing is on an enlarged scale, with Fig. 1 greatly enlarged, as stated hereinbefore, shaft 3 is actually only one-eighth of an inch in diameter with the remaining parts in proportion.

The pin lies in the axial line of the shaft concentrically with the walls of the recess and is rigidly secured at its inner end in a socket 6 formed in the bottom of said recess. The outer end of the pin 5 protrudes from the recess and is provided with a conical pivot point 7 which forms the apex for and continuation of a conical tapered end portion 8 of the shaft 3.

The tubular recess 4 about the spring pivot pin 5 is of such diameter that said pin is free to bend slightly therein and permit the outer end or pivot point 7 to move with respect to the axis of the shaft, that is the pivot point 7 is resiliently connected with the shaft through the medium of the spring pivot pin which is enclosed within the shaft. The arrangement is, in effect, a shaft having a conical end, the point of which is carried at the end of a flexible core member which lies within it.

The pivot point 7 seats in a conical bearing 9 provided in a bearing block or stud 10 of any suitable material. The bearing 9 is of such depth that the conical end 8 of the shaft lies therein when the pivot point 7 is seated. The angle included within the cone of the bearing 9 is substantially greater than the angle included within the taper of the pivot point and the conical end of the shaft, so that the pivot point seats therein only at its end and said conical end of the shaft is normally out of contact therewith as shown. In the present example the angle included within the cone of the bearing is approximately 68 degrees, while that included in the taper of the shaft end and pivot point is approximately 60 degrees.

The arrangement in the above bearing structure is such that the conical end 8 of the shaft will strike the bearing surface about the seat for the pivot point when the shaft is deflected sufficiently by vibration or shock, thus providing an auxiliary bearing to receive the force of the deflection and prevent injury to the main bearing which may be considered as comprising the pivot point and bearing seat for the pivot point. The length of the spring pivot pin 5 is so proportioned with respect to its diameter that it provides sufficient flexibility to permit the shaft to deflect and strike the bearing while the deflecting force is of comparatively low value. The excess force over this value is then transmitted from the shaft directly to the bearing pivot stud 10 through the auxiliary bearing and not through the main bearing or pivot point.

The distance which the shaft end must be deflected to strike the bearing is short and is represented by the clearance space between the conical shaft end 8 and the adjacent surface of the bearing 9. In the present example this distance is determined by the relative values of the above-mentioned angles included in the pivot point and in the bearing, but in any case it is less than the clearance space between the pin 5 and the wall of the counterbored recess 4. The more nearly equal these angles are, the shorter is the travel of the shaft before relieving the load on the pivot point. The angles given are those which at present seem to give the most satisfactory results in actual use in a planimeter, such as is indicated in Fig. 2.

Referring more particularly to Fig. 2, 11 is the frame of the planimeter provided with integral bearing supports 12 which extend downwardly therefrom in spaced relation to each other. Between the bearing supports is mounted the shaft 3 to which adjacent one end, is secured a planimeter wheel 13 and adjacent the opposite end is secured a worm gear 14. The worm gear 14 drives the usual planimeter mechanism, indicated by a pin wheel 15 which meshes with it, as the planimeter wheel 13 is rolled over a surface 16 being planimetered.

Both ends of the shaft 3 are journalled, according to the showing in Fig. 1, in bearing studs 17 and 18 which lie in axial alignment with the shaft in the bearing supports 12. Stud 17 is fixed while stud 18 is movable axially with respect to it to permit shaft 3 to be inserted between them.

Stud 18 is provided with an adjusting means by which it is moved to hold the shaft 3 without end play in its bearings and a locking means for holding it in adjustment. The adjusting means is a thumb screw 19 having an enlarged head 20, one edge of which lies in a slot 21 in the stud adjacent the outer end of said stud. The thumb screw 19 is threaded into a tapped hole 22 which is adjacent and axially parallel with the stud. When the thumb screw is turned the stud is moved with it axially toward or away from fixed stud 17 depending upon which way said screw is turned. The locking means is a set screw 23 threaded into the bearing support in a position to engage the stud 18 at one side when tightened. This adjusting and locking means may be taken as representing any suitable arrangement for performing the same function.

By providing the planimeter with the spring pivot bearing shown in Fig. 1, it is possible to take advantage of the low friction losses in a delicately pointed pivot bearing without having its accuracy impaired by the occasional accidental dropping of the instrument on the surface to be planimetered or other shock incident to its use.

The present invention has provided a simple, rugged bearing structure of small size which requires no protective means. The shaft is therein flexibly supported on the pivot point and is easily deflected into contact with the auxiliary bearing about said pivot point. Thus any excess load imparted to the shaft over that necessary to deflect the shaft end into contact with the auxiliary bearing is carried by the more rugged shaft itself and not by the delicate pivot point.

While the invention has herein been described in connection with what is at present considered to be its preferred embodiment, it should be understood that it may be carried out by other means.

What I claim as new and desire to secure by Letters Patent of the United States is:—

1. In combination, a shaft having a socket adjacent one end and a counterbored recess between the socket and said end which latter is tapered, a bearing member having a conical seat into which the tapered end of the shaft projects, there being a clearance between the end of the shaft and the seat, and a pivot pin which is secured at one end in the socket and which at its opposite end engages the seat, said pin being spaced from the wall of the recess by a clearance which is greater than that between said end of the shaft and the conical seat.

2. In combination, a shaft having a conical end and a tubular axial recess formed in said end, a spring pivot pin which lies within the recess concentrically therewith and which is rigidly secured at its inner end in the bottom of the recess, a conical pivot point at the outer end of said spring pivot pin forming the apex and continuation of the conical shaft end, said spring pivot pin providing a flexible resilient connection between the pivot point and the shaft whereby the shaft may be deflected with respect to the pivot point, a conical bearing providing a seat for the pivot point and a bearing surface about said seat for receiving the thrust of the shaft end when the latter is deflected.

3. In combination, a shaft having a conical end terminating in a pivot point, a bearing member having a conical seat with which the pivot point engages and into which the conical shaft end projects, the angle included within the conical shaft end being less than the angle included within the conical seat whereby said conical end lies in spaced relation to said seat, a flexible pivot pin by which the pivot point is carried at one end, said shaft having an axially extending recess in said conical end terminating at its inner end in an axially extending socket in which socket the pivot pin is seated and within which recess the pivot pin lies in spaced relation to the wall thereof, the space between the pivot pin and said wall in a radial direction being greater than the radial distance between the conical shaft end and the conical seat at the nearest point of approach of the latter to said conical shaft end.

In witness whereof, I have hereunto set my hand this 16th day of June, 1924.

ALEXANDER J. R. FIEGO.